Feb. 15, 1966   A. P. HALLER   3,235,726
TIRE PRESSURE DETECTOR AND INDICATOR SYSTEM
USING RADIOACTIVITY
Filed July 12, 1962   3 Sheets-Sheet 1
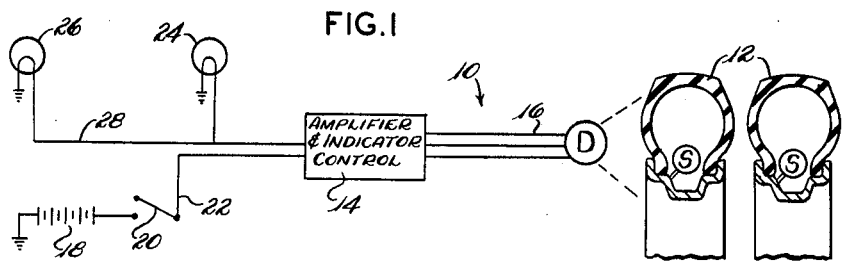
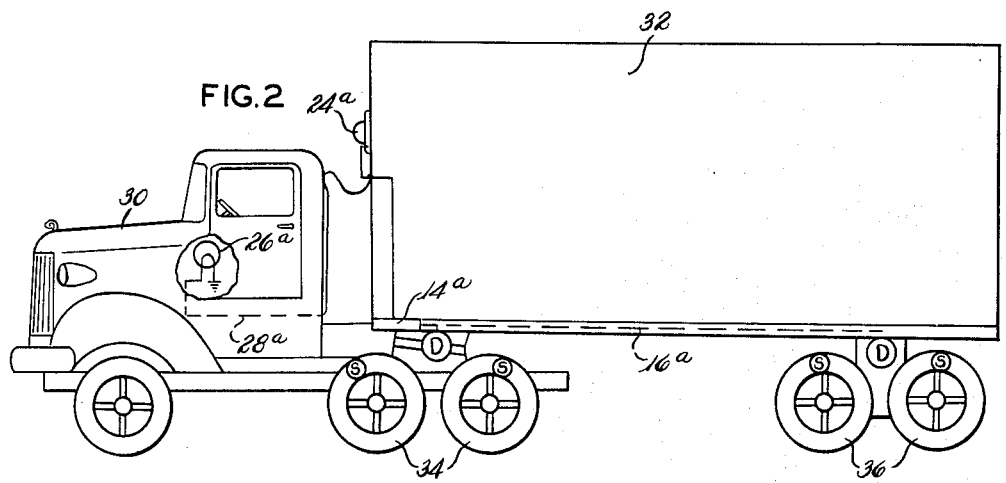
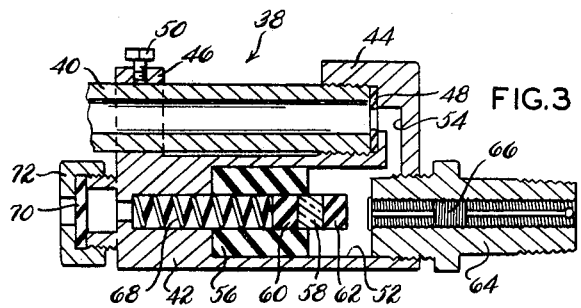
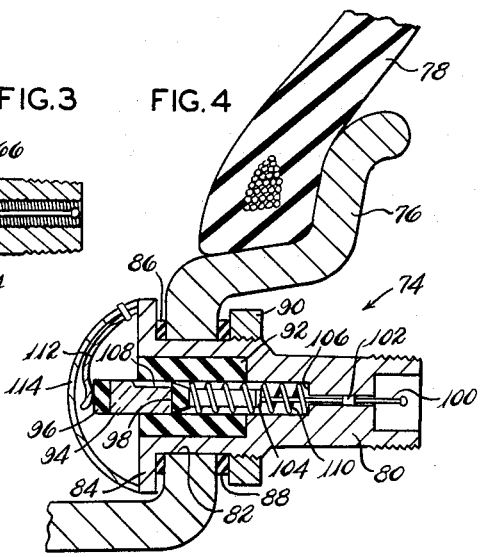
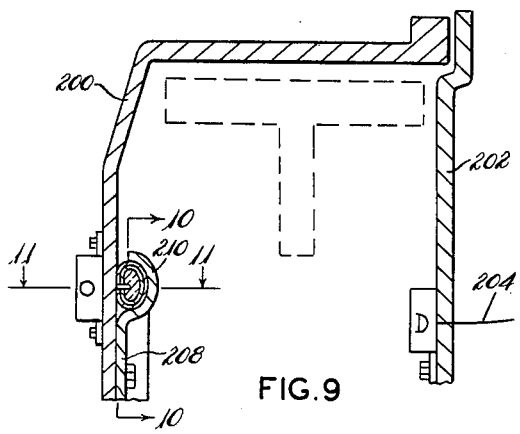
INVENTOR.
ALTON P. HALLER
BY Richard E. Bartz
ATTYS.

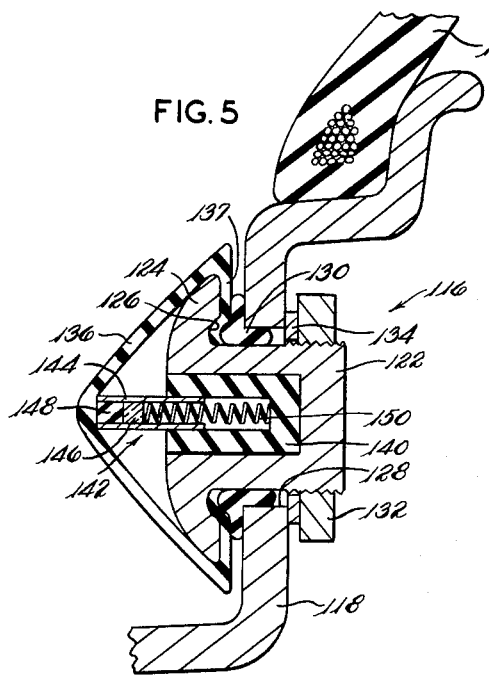
FIG. 5
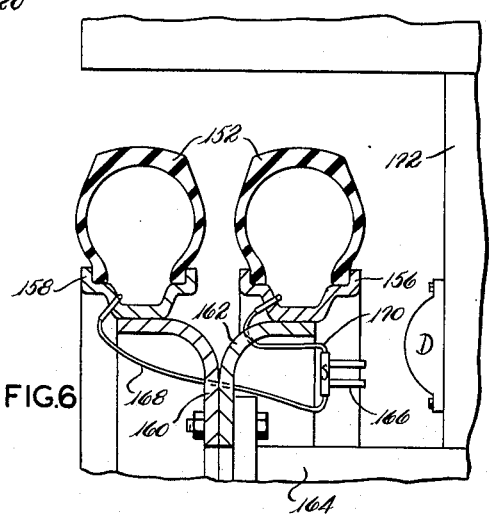
FIG. 6
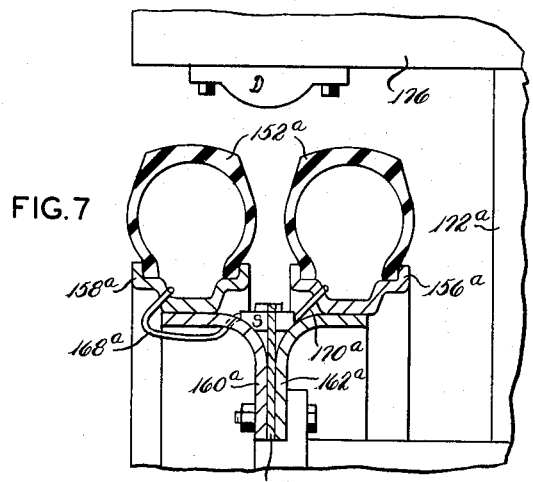
FIG. 7
FIG. 8
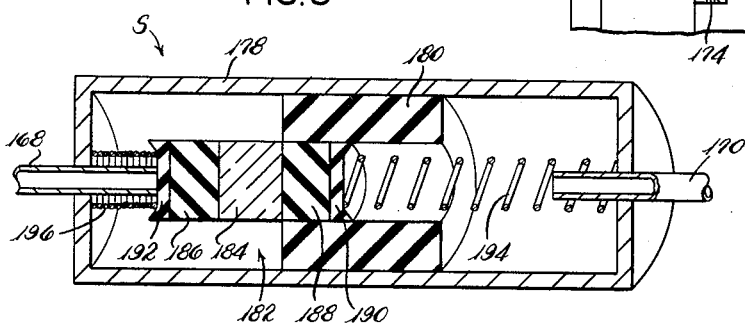
INVENTOR.
ALTON P. HALLER Feb. 15, 1966 A. P. HALLER 3,235,726
TIRE PRESSURE DETECTOR AND INDICATOR SYSTEM
USING RADIOACTIVITY
Filed July 12, 1962 3 Sheets-Sheet 3

INVENTOR.
ALTON P. HALLER
BY Richard E. Bartz
ATTYS.

United States Patent Office 3,235,726
Patented Feb. 15, 1966

3,235,726
TIRE PRESSURE DETECTOR AND INDICATOR
SYSTEM USING RADIOACTIVITY
Alton P. Haller, 673 Hillsdale Ave., Akron, Ohio
Filed July 12, 1962, Ser. No. 209,380
11 Claims. (Cl. 250—43.5)

The present invention relates to apparatus for the detection and indication of fluid pressure in a fluid chamber and more particularly to apparatus having a shielded radioactive source and a radioactivity detector to detect and indicate a reduced fluid pressure in vehicle tires.

Cargo carrying vehicles, as tractor trailer trucks and buses, travel or cannonball long distances over modern expressways at sustained high rates of speed. Under these conditions the fluid pressure of the vehicle pneumatic tires must be maintained because a flat tire which is undetected by the driver will quickly disintegrate and may burn destroying the entire vehicle and cargo. An undetected flat tire increases the loads upon the inflated tire. The inflated tire will rupture which may cause the vehicle to turn over.

Flat tire detectors have been constructed to warn the driver of the amount of fluid pressure in tires on a moving vehicle. These detectors use radio signals and electrical circuits to provide a signal recognizable for the driver. The prior detectors are relatively expensive and unreliable. They are bulky and easily damaged because they must be located in an exposed location to operate effectively.

It is the general object of the invention to avoid and overcome the foregoing and other difficulties of and objections to the prior art systems by the provision of a flexible and relatively inexpensive and simple apparatus for detecting and indicating the fluid pressure in a fluid chamber.

Another object of the invention is to provide a fluid pressure detection and indication system that is highly reliable and maintenance free.

Another object of the invention is the provision of a flat tire detector and indicator system that is easily installed in existing vehicles.

A further object of the invention is the provision of an apparatus for the detection and indication of fluid pressure in a fluid chamber that protects the components thereof from damage and adverse operating conditions.

A further object of the invention is the provision of a fluid pressure detection and indicating apparatus that can detect a pressure change in a rotating pressure chamber without having a direct connection to said chamber.

A further object of the invention is to provide a fluid pressure detector and indicator apparatus which utilizes a single signal to detect adverse pressures in a plurality of pressure chambers.

According to the invention, a radioactive isotope is used to produce a signal to show the amount of fluid pressure in a fluid chamber. A radioactivity shield is positioned between the radioactive material and a radioactivity detector. The reduction of the fluid pressure in the chamber permits relative movement between the radioactive material and the shield in an amount which will separate the radioactive material from the shield. The energy rays emitted from the radioactive material activates the radioactivity detector to produce an output signal which triggers indicators showing the reduction of pressure in the chamber.

The exact nature of the invention as well as other objects and advantages thereof will be readily apparent from a consideration of the following specification relating to the annexed drawing in which:

FIG. 1 is a schematic diagram of the apparatus for the detection and indication of a flat tire according to the invention.

FIG. 2 shows the apparatus of FIG. 1 applied to a tractor trailer vehicle.

FIG. 3 shows a cross section of a pressure position shielded radioactive source usable in the detector and indicator apparatus of FIG. 1.

FIG. 4 shows a cross section of a pneumatic tire valve stem having a pressure positioned radioactive source usable in the detection and indication apparatus of FIG. 1.

FIG. 5 shows a cross section of a pressure positioned shielded radioactive source within a pneumatic tire.

FIGS. 6 and 7 show a pressure positioned shielded radioactive source secured to rotatable dual vehicle wheels and a detector mounted on the vehicle frame in close proximity to the radioactive source.

FIG. 8 is a sectional view of the pressure responsive shielded radioactive source used in FIGS. 6 and 7.

FIG. 9 shows a modified form of a reduced pressure indicating apparatus constructed according to the invention and position within a brake drum.

Figure 10:
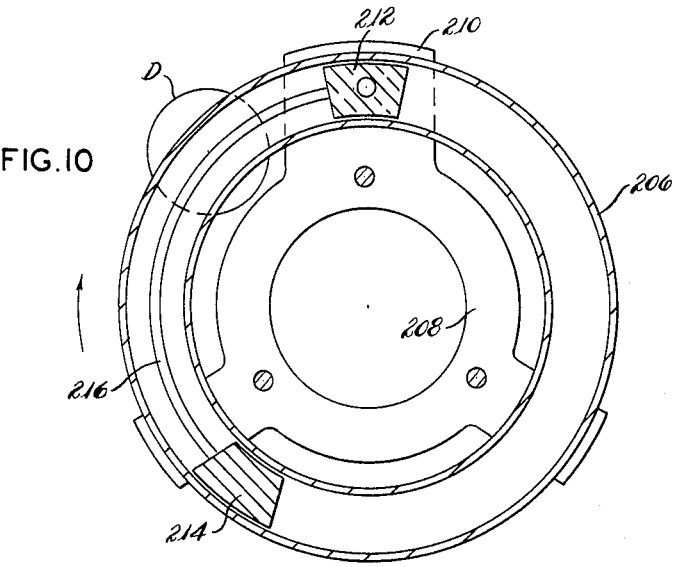
FIG. 10 shows a cross section of the shielded radioactive source of the apparatus of FIG. 9 taken along the line 10—10.

Referring to the drawing, there is schematically shown in FIG. 1 an apparatus 10 for the detection and indication of a reduction in pressure in the fluid pressure chambers 12 shown as tires. A normally shielded radioactive source S is connected to each pressure chamber so that upon a reduction of pressure in the chamber the radioactive material and the shield means therefor move relative to each other thereby permitting the energy rays of the radioactive material to activate a detector D. The radioactive material is derived from an extremely compact and strong gamma-ray radiating material such as cobalt 60 or cesium 137. The detector D, such as an ionization chamber, Geiger-Muller counter, or a semi-conductor junction, produces output signals when activated by the energy rays from the radioactive material. To increase the sensitivity of the detector D and compensate for the energy rays lost by absorption and scattering, the detector D is positioned adjacent the source S so as to scan the area through which the source passes.

A detector amplifier and indicator control 14 is connected by a coaxial cable 16 to the detector D. A source of electrical power 18 controlled by a manually controlled switch 20 is connected to the control 14 by an electrical conductor 22. The amplifier 14 augments the output signal from the activated detector D and energizes the indicator control therein to produce an indicator signal. This indicator signal alternately turns the lamps 24 and 26 on and off. The electrical conductor 28 connects the lamps 24 and 26 to the indicator control 14 and permits the lamps to be positioned where they can be easily seen.

FIG. 2 shows the pressure detection and indication apparatus 10 incorporated in a tractor trailer vehicle. The identical parts of the apparatus are identified with the same reference number having a suffix "a". The tractor 30 and trailer 32 have pneumatic tires 34 and 36. A shielded radioactive source S is operatively connected to the pressure chamber of each tire. A reduction of pressure in any tire will move the radioactive material connected thereto from its shielded position. The unshielded radioactive material activates the detector D which scans the tire. The activated detector produces output signals which are amplified and altered into indicator signals by the amplifier and indicator control 14a positioned on the trailer 32. The indicator signal is conducted by the conductor 28a to a trailer indicating lamp 24a and a tractor indicating lamp 26a. The alternate ignition of the lamps provide a visual indication of a flat tire condition.

FIG. 3 shows a specific embodiment of the pressure position shielded radioactive source S. The shielding device 38 is removably secured to a conventional valve stem 40. The device contains a housing 42 having a threaded portion 44 and a guide portion 46. The threaded portion 44 engages the outer threads of the valve stem 40 and is sealed thereon by a seal 48. The guide portion 46 surrounds the lower portion of the valve stem 40 and is secured thereto by means of a set screw 50. The housing 42 contains a chamber 52 connected by a passage 54 to the passage of the valve stem 40. Radioactivity shielding material 56 such as lead, boron, uranium, or other high density material in the shape of a hollow cylinder is positioned within the housing 42 and forms one end of the chamber 52. Radioactive material 58 positioned within plastic, glass, or other low density material is shaped in the form of a pellet which is movable within the cylinder formed by the shielding material 56. To confine the radioactive rays the radio-active material 58 is positioned between radioactivity shelding material 60 and 62. The shelding material 60 and 62 sandwiching the radioactive material 58 forms a piston movable in the cylindrical shielding material.

A plug 64 containing a valve core 66 is threaded in the housing 42 and forms the opposite end of the chamber 52. The fluid pressure in chamber 52 urges the piston into the hollow cylindrical shielding material 56 against the force of compression spring 68. A rubber diaphragm 70 retained on the housing 42 by a cup-shaped nut 72 prevents dirt and foreign material from entering the chamber 52 and provides an expansion chamber for the fluid compressed by the piston as it moves in the hollow cylindrical shielding material 56.

The device operates to expose the radioactive material 58 when there is a reduced tire pressure. A reduction in tire pressure will reduce the pressure in chamber 52 permitting the compression spring 58 to urge the piston, formed from the radioactivity shielding discs 60 and 62 and the radioactive material 58, out of the hollow cylindrical shielding material 56. The energy rays emulating from the radioactive material 58 are detected by a detector D when the radioactive material 58 is moved from the confines of the shielding material 56.

The pneumatic tire valve 74 shown in FIG. 4 has a shielded pressure positioned radioactive source. The cylindrical valve 74 is positioned in the vertical flange of a wheel rim 76. The rim 76 supports tire 78. Valve 74 has a cylindrical housing 80 positioned in a bore 82 in the rim 76. A circumferential housing flange 84 forms the inner end of the housing 80. A pair of annular seals 86 and 88 surround the housing 80 and are positioned on opposite sides of the rim 76. A nut 90 threaded on a portion of the housing 80 secures the housing in the rim 76.

A hollow cylindrical radioactivity shield 92 formed from lead, boron, uranium, or other high density material is longitudinally positioned within the valve housing 80. A cylindrical pellet 92 of radioactive material sandwiched between and secured to a pair of disc radioactivity shields 96 and 98 is slidably disposed within the hollow cylindrical shield 92. A valve stem 100 is longitudinally positioned in a stepped diameter bore in the housing 80 by a guide 102. The stem 100 is fastened to a pellet 94 and shield 98 and extends therefrom to the outside end of housing 80. A cylindrical seal 104 is secured to the stem 100 midway between its ends. The seal 104 engages the sealing edges 106 of the housing 80 and is held in sealing engagement therewith by the pressure in the tire. Longitudinal grooves 108 in the radioactive plug 94 permits the fluid to flow past the valve seal 104 to the interior of the tire. A compression spring 110 surrounds the valve stem 100 and engages a portion of the housing 80 adjacent the sealing edges 106 and the outer portion of the shield 98. The spring 110 urges the radioactive pellet 94 out of the cylindrical radioactivity shield 92 against the force of the pressure in the tire. A leaf spring 112 secured to the flange 84 by a semicircular guard 114 engages the inner disc shield 96 to prevent the pellet 94 from being forced out into the tire chamber by the action of the compression spring 110 and the air being forced into the tire.

The fluid pressure in the tire holds the valve stem seal 104 in engagement with the sealing edges 106. Since the valve stem 100 is secured to the pellet 94 the pressure within the tire will compress the spring 110 and hold the plug within the confines of the cylindrical shield 92. When the tire is flat there is a marked reduction of pressure therein causing the spring 110 to urge the radioactive pellet 94 out of the shield 92. The energy rays emulating from the radioactive material readily penetrate the tire walls 78 to activate a radioactivity detector D.

FIG. 5 shows a pressure positioned radioactive source within a cylindrical plug 116. The plug is secured within a vertical portion of a wheel rim 118. The rim 118 supports tire 120. The plug comprises a cup-shaped housing 122 having an outwardly extending cylindrical flange 124. The flange 124 has annular groove 126 in its outer surface to retain annular seals. The housing 122 is positioned in a bore 128 in the rim 118. An annular seal 130 having an angular cross section is positioned within said bore between the housing and the rim. A nut 132 is threaded on the outer end of the housing 122. The nut 132 urges a flat ring seal 134 into engagement with the wheel rim 118 to hold the housing 122 on the rim.

A semi-spherical seal 136 having a disc base 137 is positioned over the flange 124 to enclose the inner end of the housing 122. The disc base 137 of the seal has an annular rib positioned at its inner periphery to fit into the annular groove 126 of the flange 124. The nut 132 urges the flange 124 and the seals 130 and 137 into sealing engagement with the inner wall of the rim 118.

A cup-shaped radioactivity shield 140 formed from lead, boron, uranium, or other high density material is positioned within the cavity of the cup-shaped housing 122. A piston 142 is slidably disposed within the bore of the shield 140. The piston 142 comprises a sleeve 144 confining a portion of radioactive material 146 between a radioactivity shield plug 148 and a compression spring 150. The outer end of the piston engages a central portion of the semi-spherical flexible seal 136.

Fluid pressure on the semi-spherical seal 136 urges and holds the piston 142 within the shield 140. The normal tire pressure is sufficient to compress the spring 150 and the fluid within the chamber defined by the semi-spherical seal 136. The compression spring 150 and the pressure within the chamber defined by the semi-spherical seal 136 will move the piston 142 containing the radioactive material 146 out of the cup-shaped seal 140 when there has been a substantial reduction in tire pressure. The energy rays emulating from the radioactive material readily penetrate the flexible seal 136 and the walls of the tire 120 to activate a detector.

FIGS. 6 and 7 show a normally shielded radioactive source positioned on dual vehicle wheels adjacent a detector D secured to the vehicle frame. The vehicle structure shown in FIG. 7 is identical with the vehicle structure shown in FIG. 6 and is identified with the identical reference numbers having the suffix "a." The tires 152 are supported on rims 156 and 158. The rims are supported by flanges 160 and 162 on the rotatable axle 164. The normally shielded radioactive source S is secured by clamps 166 to the side of the inside rim 156. Flexible conduits 168 and 170 by means of suitable couplings connect the pressure chambers of the tires to the opposite ends of the normally shielded radioactive source. A radioactivity detector D is mounted on the vertical frame portion 172 of the vehicle in close proximity to the source S.

FIG. 7 shows the source S positioned between the tires by a plate 174. A detector D is secured to the horizontal portion of the frame 176 above the source. This position permits the source to be placed closer to the axis of rotation of the tires to reduce the effects of the centrifugal force upon the source.

The radioactive source S shown in FIG. 8 comprises a hollow housing 178 formed from material that has a low radioactivity shielding characteristic. The housing is divided into two pressure chambers by a cylindrical radioactivity shield 180. The shield 180 is formed from a high density material as lead or uranium. A double acting piston 182 is slidably disposed in the cylindrical bore formed by the shield 180. The piston contains radioactive material 184 sandwiched between a pair of radioactivity shields 186 and 188. A pair of shallow cup-shaped seals 190 and 192 are secured to the outer ends of each of the shields 186 and 188. A compression spring 194 engages the seal 190 and the housing and wall 178 to urge the piston against a second compression spring 196 which engages the seal 192 and the opposite end wall of the housing 178. The compression springs function to maintain the piston within the confines of the shield 180.

The piston 182 reciprocates in the radioactivity shield 180 in response to a reduction of pressure in either of the chambers. The piston will move into the chamber which has a reduced pressure and will anchor upon extensions of the conduits 168 or 170. As shown in FIG. 8 the left-hand chamber has a reduced pressure. The spring 194 aids the movement of the piston into the reduced pressure chamber. With the piston in this position the energy rays emulating from the radioactive material 184 readily penetrates the housing 178 to activate the detector D. Since the pressure in the respective chambers is a function of the pressure in the tires 152 the activation of the detector is indicative of a reduced pressure in one of the tires.

Figure 11:
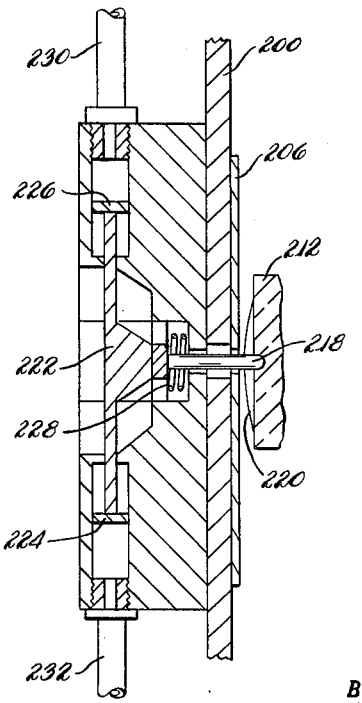
FIG. 11 is a horizontal cross section taken along line 11—11 of FIG. 9 showing the pressure responsive mechanism for holding the radioactive material adjacent the radioactivity shield.

The modified pressure detector and indicator system shown in FIGS. 9, 10, and 11 is positioned within the cavity formed by the brake drum 200 and the stationary backing plate 202. The detector D is mounted on the inner surface of the backing plate and is operably connected by conductor 204 to indicator means as shown in FIG. 1. An annular tube 206 is positioned on the inner face of the radial flange of the brake drum 200 by means of a spider 208. The arms of the spider extend over the tube to clamp it to the brake drum. The arm 210 of the spider is slightly thicker and arcuately longer and functions as a radioactivity shield.

Radioactive material 212 and a relatively heavy weight 214 are positioned within the tube and are secured to each other by means of an arcuate wire rod 216. The weight 214 is circumferentially spaced from the radioactive material by a distance that is less than one-half the circumference of the tube. The weight follows the radioactive material when the brake drum is rotating in the forward direction.

As shown in FIG. 11 the radioactive material 212 is locked in the tube to position the radioactivity shield between the detector D and the radioactive material 212. A locking pin 218 engages a cavity in the radioactive material 212 formed by a pair of leaf springs 220. A wedge slide 222 engages the slotted head of the pin 218 to hold the pin in the lock position. Oppositely acting pistons 224 and 226 secured to opposite ends of the slide are operative to move the wedge portion of the slide from the pin head. When the wedge portion is moved from the pin head the compression spring 228 engaging the head moves the pin 218 to the unlock position. Thus, the radioactive material 212 is unrestrained within the tube 206. The weight 214 by the action of gravity moves the radioactive material from the shield 210 and holds the radioactive material in close proximity to the detector D. This permits the use of a relatively weak source of radioactive material. A suitable lubricant may be inserted into the tube to reduce the friction between the weight and tube.

The pistons are biased by fluid pressure from each tire on the wheel. Flexible conduits 230 and 232 and suitable couplings therefor interconnect the fluid pressure of the pressure chambers of the tires to the pistons 224 and 226. A reduction of pressure in either tire will move the wedge portion of the slide from the head of pin 218. The flexible conduits may be secured to both the wheel support and tire rim so that the conduit will be severed if the tire rim becomes loose on the wheel support.

While there have been shown, described, and pointed out the fundamental novel features of the invention as applied to the preferred embodiment, it will be understood that various omissions, substitutions, changes in form, and details of the apparatus illustrated may be made by those skilled in the art, without departing from the spirit of the invention. It is intended to be limited only as indicated by the scope of the following claims.

What is claimed is:

1. Apparatus for the detection and indication of a flat tire on a moving vehicle comprising housing means adapted to be secured to a rotatable portion of a wheel assembly in fluid relation with the fluid pressure of at least one tire of the wheel assembly, radioactivity shield means positioned within said housing means, radioactive material positioned in said housing means for movement relative to said shield means between a shielded position and an exposed position, said housing means being exposed to the fluid pressure of said tire whereby the normal fluid pressure in the tire holds the radioactive material in the shielded position, means urging the radioactive material to the exposed position in response to a reduction of pressure in said tire, detector means activated by the energy rays of the unshielded radioactive material to produce an output signal, and indicator means responsive to said output signal showing the flat tire condition.

2. Apparatus for the detection and indication of a reduced pressure in either a first or second fluid pressure chamber comprising radioactive means, radioactivity shield means normally surrounding the radioactive means, a hollow housing surrounding the shield means and forming a pressure chamber at each end thereof, means connecting the first fluid pressure chamber with one housing chamber and connecting the second fluid pressure chamber with the other housing chamber whereby upon a reduction of pressure in either the first or second chamber the radioactive means will move out from the shield means, biasing means engaging the housing and the radioactive means to resiliently hold the radioactive means within the shield means when the pressure in the first and second chambers is substantially equal, detector means activated by the energy rays of the radioactive means to produce an output signal, and indicator means responsive to said output signal showing a reduction of pressure in either the first or second chamber.

3. In an apparatus for the detection and indication of a reduced pressure in either a first or second fluid pressure chamber
   radioactive means,
   radioactivity shield means normally surrounding the radioactive means,
   a hollow housing surrounding the shield means and forming a pressure chamber at each end thereof,
   means connecting the first fluid pressure chamber with one housing chamber and connecting the second fluid pressure chamber with the other housing chamber whereby upon a reduction of pressure in either the first or second chamber the radioactive means will move out from the shield means, and
   biasing means engaging the housing and the radioactive means to resiliently hold the radioactive means within the shield means when the pressure in the first and second chambers is substantially equal.

4. In an apparatus for the detection and indication of a reduced pressure in a fluid pressure chamber
   a removable plug positionable in a wall of the chamber so that one portion of the plug is exposed to the pressure of the chamber,
   a hollow radioactivity shield positioned within said plug with one end thereof in the portion of the plug exposed to the pressure of the chamber,
   a piston containing radioactive material slidably disposed in the hollow shield, said piston being normally positioned in the shield by the pressure in the chamber, and
   biasing means urging the piston out of the hollow shield against the force of reduced fluid pressure in the chamber.

5. In an apparatus for the detection and indication of a reduced pressure in a fluid pressure chamber
   a removable cup-shaped plug positionable in a wall of the chamber so that the open portion of the plug is exposed to the pressure of the chamber,
   a hollow cup-shaped radioactivity shield positioned within said plug with the open end thereof exposed to the pressure of the chamber,
   a piston containing radioactive material slidably disposed in the hollow shield,
   a flexible shield positioned over the open portion of the plug and engaging the piston to urge the piston into the shield, and
   biasing means positioned between the piston and the base of the shield to urge the piston out of the shield against the force of reduced fluid pressure in the chamber.

6. In an apparatus for the detection and indication of a reduced pressure in a fluid pressure chamber
   a valve housing having a stepped diameter longitudinal bore positionable in a wall of the chamber so that one portion of the housing is in fluid communication with the chamber,
   a hollow radioactivity shield positioned in the portion of the housing adjacent the chamber,
   a piston containing a radioactive pellet sandwiched between a pair of radioactivity shields slidably disposed in the hollow shield,
   said piston being normally positioned in the hollow shield by the pressure in the chamber,
   a valve stem extending through the longitudinal bore in the housing, the inner end of the stem being secured to the piston,
   a seal secured to the stem adapted to engage a stepped portion of the bore to confine fluid in the chamber, and
   biasing means connected to the piston to urge the piston out of the hollow shield.

7. Apparatus for the detection and indication of a reduced pressure in either a first or second fluid pressure chamber comprising
   radioactive means,
   detector means activated by the energy rays of the radioactive means to produce an output signal,
   radioactivity shield means positioned between the detector means and the radioactive means to reduce the intensity of the energy rays striking the detector means,
   means responsive to the normal fluid pressure in the first and second fluid pressure chamber to hold the radioactive means adjacent the shield means,
   means urging the radioactive means to move from the shield means when there is a reduction of fluid pressure in either the first or second chamber thereby activating the detector means to produce output signals, and
   indicator means responsive to said output signal showing a reduction of pressure in either the first or second chamber.

8. Apparatus for the detection and indication of a flat tire on a dual wheel having a brake drum and a backing plate comprising
   an annular tube concentrically secured to the inner surface of the radial flange of the brake drum,
   radioactive means positionsd within the tube, weight means positioned within the tube and being circumferentially spaced from and secured to the radioactive means,
   radioactive shield means between a portion of the tube and the backing plate,
   lock means for holding the radioactive means in the tube adjacent the shield means,
   means responsive to a reduction of fluid pressure in either tire of the dual wheel to release the lock means thereby allowing the weight means to move the radioactive material from the shield means,
   detector means mounted on the backing plate adjacent the unshielded portion of the tube, said detector means being activated by the energy rays of the unshielded radioactive means to produce an output signal, and indicator means responsive to said output signal showing the flat tire condition.

9. In an apparatus for the detection and indication of a reduced pressure in either a first or second rotating fluid pressure chamber,
   an annular tube concentrically secured to the rotating chambers, radioactive means positioned within the tube,
   weight means positioned within said tube and being circumferentially spaced from and secured to the radioactive means,
   radioactivity shield means,
   lock means for holding the radioactive means adjacent the shield means, and
   means responsive to a reduction of pressure in either the first or second chamber to release the lock means thereby allowing weight means to move the radioactive material from the radioactivity shield means.

10. Apparatus for the detection and indication of a flat tire on a vehicle comprising radioactive means, detector means activated by the energy rays of the radioactive means to produce output signals, radioactivity shield means normally positioned between the radioactive means and the detector means in response to normal fluid pressure in the tire to reduce the intensity of the energy rays striking the detector means, means responsive to a reduction of pressure in said tire to provide relative movement between said shield means and the radioactive means to expose said radioactive means to said detector means whereby the energy rays emitted from said radioactive means activate said detector means, and means responsive to the output signals from the activated detector means to indicate a flat tire condition.

11. Apparatus for the detection and indication of a low pressure condition in a first tire and a second tire on a vehicle comprising radioactive means, detector means activated by the energy rays of the radioactive means to produce output signals, radioactivity shield means normally positioned between the radioactive means and the detector means in response to normal fluid pressure in said first tire and second tire to attenuate the energy rays striking the detector means, means responsive to a reduction of fluid pressure in one of said tires to provide relative movement between said shield means and the radioactive means to expose said radioactive means to said detector means whereby the energy rays emitted from said radioactive means activate said detector means, and means responsive to the output signals from the activated detector means to indicate a flat tire condition.

References Cited by the Examiner

UNITED STATES PATENTS

| | | | |
|---|---|---|---|
| 2,417,940 | 3/1947 | Lehman | 73—146.5 X |
| 2,727,221 | 12/1955 | Sprigg | 340—58 |
| 2,745,969 | 5/1956 | Keller | 250—106 X |
| 2,821,636 | 1/1958 | Jefferson | 250—106 |

FOREIGN PATENTS 914,826    7/1954    Germany.

RALPH G. NILSON, *Primary Examiner.*

ARCHIE R. BORCHELT, *Examiner.*